April 16, 1935.   R. D. CONKLIN   1,998,222

PNEUMATIC TREADLE

Original Filed Aug. 4, 1933

INVENTOR
Roscoe D. Conklin
BY
ATTORNEYS.

Patented Apr. 16, 1935

1,998,222

UNITED STATES PATENT OFFICE 1,998,222

PNEUMATIC TREADLE

Roscoe D. Conklin, Rahway, N. J., assignor to National Pneumatic Company, Rahway, N. J., a corporation of West Virginia Original application August 4, 1933, Serial No. 683,609. Divided and this application August 7, 1934, Serial No. 738,869

2 Claims. (Cl. 137—111)

This invention relates to improvements in pneumatic treadles by means of which the structure is greatly simplified.

The general object of this invention is to provide in a simple construction a pneumatic treadle comprising a compressible casing having a fluid conduit therethrough which is closed to interrupt the flow of fluid when pressure is applied to the treadle.

This invention has many objects, as will be apparent from the following description.

This invention resides substantially in the combination, construction, arrangement and relative location of parts, all as will be described in greater detail in the following specification.

Figures 1, 2:
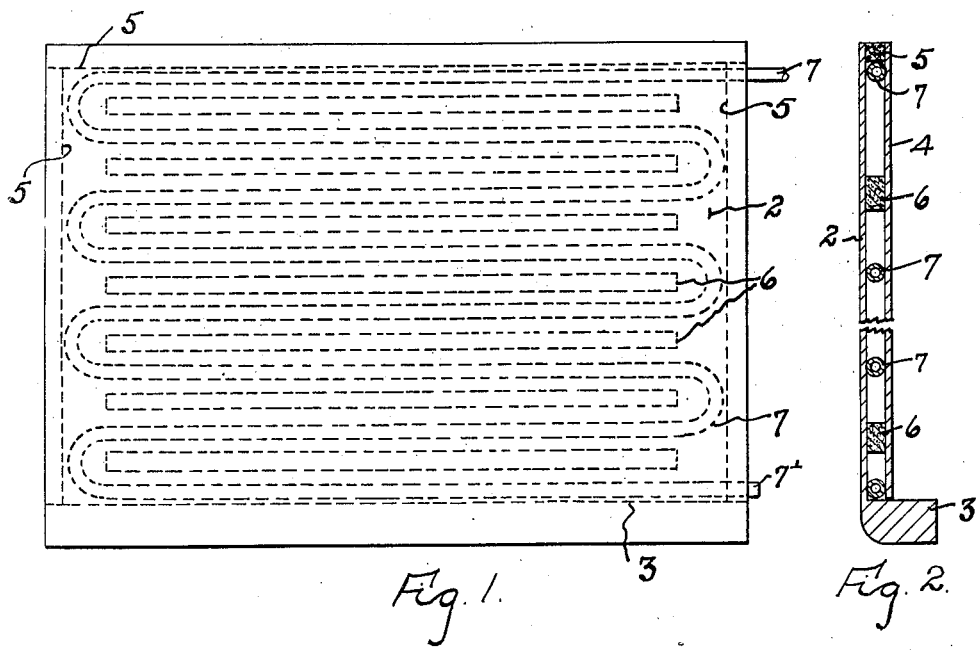
Figure 1 is a plan view of the treadle structure of this invention.
Figure 2 is an enlarged cross-sectional view thereof.

The treadle structure comprises an upper tread plate 2 and a base plate 4, which are preferably made of some flexible material, such as rubber, rubberized fabric, and the like. The tread and base plates are secured together around their edges to provide a closed moisture-proof compartment. They are held together in spaced relation by means of the strips 5 which may be made of any suitable material but preferably of a stiff, relatively hard, rubber so that they may be vulcanized directly to the tread and base plates to form the sealed compartment which is rigid as a whole but flexible at the area within its edges. The forward edge of the tread plate is formed over at right angles to the plane thereof and is preferably of thicker cross-section, as indicated at 3, to form a nose which fits over the step adjacent the door to be controlled. It is, of course, apparent that the treadle may be made in accordance with this invention without employing this nose piece. Interposed between the tread and base plates at suitably spaced points are the soft or compressible rubber strips 6 which act to normally hold the plates in proper spaced relation. Distributed between the plates within the compartment formed thereby is a soft flexible tube 7, preferably made of rubber, which opens at its end 7' directly to the atmosphere and which is connected at its other end to any suitable pressure fluid source. It is, of course, apparent that this end of the tube may be connected to a pressure fluid source maintained above atmospheric pressure or below atmospheric pressure.

One manner of employing a treadle of this type is illustrated in my co-pending application Serial No. 683,609, filed August 4, 1933, of which the present application is a division.

For the purposes of this disclosure, it is sufficient to note that when pressure is applied to the tread plate it is depressed so as to collapse the walls of the tube 7 at one or more points so as to cut off the flow of fluid therethrough. A back pressure then builds up in the flexible tube from that point back through the end that is connected to the pressure source, thereby operating any suitable form of control mechanism connected thereto.

From the above description it will be apparent that this invention resides in certain principles of construction and operation as illustrated in the drawing. It is recognized that those skilled in the art may readily vary the application of these principles and the structure by which they are applied without departure from the scope of this invention. I do not, therefore, desire to be strictly limited to the disclosure as given for purpose of illustration, but rather to the scope of the appended claims.

What I seek to secure by United States Letters Patent is:

1. A pneumatic treadle of the type described, comprising a base plate, a flexible tread plate, spacing members between said plates at the edges thereof, said plates being secured to said members to form a substantially closed chamber, a plurality of compressible spacing members interposed between said plates in spaced relation, and a flexible compressible conduit mounted between said plates and compressible spacing members.

2. A pneumatic treadle of the supply and waste type comprising a base plate and a flexible cover plate secured thereto to form a closed chamber, a plurality of spaced, compressible members within the chamber to form a plurality of open ended channels within the treadle and a long compressible tube lying in said channels and having both ends projecting exteriorly of the treadle, one open to the atmosphere and the other adapted to be connected to a fluid pressure source.

ROSCOE D. CONKLIN.